United States Patent
McCarty et al.

(10) Patent No.: US 10,405,062 B2
(45) Date of Patent: *Sep. 3, 2019

(54) SYSTEMS AND METHODS FOR GENERATING A SET OF CUSTOM KEYWORDS BASED ON A MEDIA ASSET

(71) Applicant: Rovi Guides, Inc., San Jose, CA (US)

(72) Inventors: Michael McCarty, Agoura Hills, CA (US); Glen E. Roe, Simi Valley, CA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/011,910

(22) Filed: Jun. 19, 2018

(65) Prior Publication Data
US 2018/0376222 A1    Dec. 27, 2018

Related U.S. Application Data

(63) Continuation of application No. 15/602,800, filed on May 23, 2017, now Pat. No. 10,028,036.

(51) Int. Cl.
| | |
|---|---|
| *G06F 3/00* | (2006.01) |
| *G06F 13/00* | (2006.01) |
| *H04N 5/445* | (2011.01) |
| *H04N 21/8405* | (2011.01) |
| *H04N 21/472* | (2011.01) |
| *H04N 21/439* | (2011.01) |
| *H04N 21/422* | (2011.01) |
| *H04N 21/482* | (2011.01) |

(52) U.S. Cl.
CPC ... *H04N 21/8405* (2013.01); *H04N 21/42203* (2013.01); *H04N 21/4394* (2013.01); *H04N 21/47202* (2013.01); *H04N 21/4828* (2013.01); *H04N 21/4821* (2013.01)

(58) Field of Classification Search
CPC ......... H04N 21/42203; H04N 21/4394; H04N 21/47202; H04N 21/4821; H04N 21/8405
See application file for complete search history.

(56) References Cited

U.S. PATENT DOCUMENTS

| | | | |
|---|---|---|---|
| 6,519,771 B1 * | 2/2003 | Zenith | H04N 5/4401 |
| | | | 348/E5.108 |
| 9,306,989 B1 * | 4/2016 | Jayaram | H04L 65/403 |
| 2017/0024375 A1 * | 1/2017 | Hakkani-Tur | G06F 17/2785 |
| 2018/0061393 A1 * | 3/2018 | Osotio | G06N 99/005 |
| 2018/0063065 A1 * | 3/2018 | Ma | H04L 51/32 |

* cited by examiner

*Primary Examiner* — Joshua D Taylor
(74) *Attorney, Agent, or Firm* — Haley Guiliano LLP

(57) ABSTRACT

Systems and methods for generating a set of custom keywords based on a media asset. The systems and methods may receive a media asset viewed by a user, receive a set of base keywords, and determine a character in the media asset. Further, the systems and methods may determine a set of custom keywords based on dialog in the media asset corresponding to the character and determine for a custom keyword, from the set of custom keywords, an equivalent base keyword from the set of base keywords. The systems and methods may determine a response to a received user request, wherein the response includes the base keyword from the set of base keywords, and generate a modified response to the user request based on the response to the user request, wherein the modified response replaces the base keyword with the custom keyword.

20 Claims, 9 Drawing Sheets

| Base Keywords | Custom Keywords |
|---|---|
| Yes | Make it So |
| Searching all Services | Hailing on all Frequencies |
| ⋮ | |

SYSTEMS AND METHODS FOR GENERATING A SET OF CUSTOM KEYWORDS BASED ON A MEDIA ASSET

CROSS REFERENCE TO RELATED APPLICATION

This application is a continuation of U.S. patent application Ser. No. 15/602,800, filed May 23, 2017, currently allowed, which is hereby incorporated by reference herein in its entirety.

BACKGROUND

A user may enjoy using one or more catch phrases uttered by a favorite character in a media asset that the user recently viewed. The user may engage in role play as his or her favorite character and issue a voice command to a media guidance system in the form of one of the catch phrases. However, conventional media guidance systems do not possess the capability to engage in such role play with the user. Instead, conventional media guidance systems may get confused and output incorrect information if the user were to issue voice commands in the form of catch phrases uttered by the user's favorite character. This may be frustrating for the user and deprive him or her of the opportunity to associate himself or herself with his or her favorite character and engage in role play when issuing voice commands to a media guidance system.

SUMMARY

Systems and methods are provided herein for generating a set of custom keywords based on a media asset. For example, a media guidance application may determine custom keywords such as "make it so" and "hailing on all frequencies" corresponding to Captain Picard and Officer Uhura, respectively, from the user's recently watched episodes of the "Star Trek" series. Further, the media guidance application may determine that "make it so" relates to a "yes" voice input and "hailing on all frequencies" relates to a voice input for "searching all services." The media guidance application may use these identified custom keywords to respond to a user request. For example, the media guidance application may respond to a request to search for the "Monsters University" movie on all services by replying with "Ok, hailing on all frequencies" instead of replying with "Ok, searching all services."

In some aspects, the media guidance application may receive a media asset viewed by a user. For example, the media guidance application may receive episode ten of the "Star Trek" series, which was recently watched by the user. The media guidance application may receive a set of base keywords. For example, the media guidance application may receive keywords that are typically used in communication with the user. Examples of such keywords include "yes," "no," "searching all services," and the like. The media guidance application may determine a character in the media asset. For example, the media guidance application may determine that Officer Uhura is a character in episode ten of "Star Trek." The media guidance application may retrieve metadata corresponding to the character in the media asset. For example, the media guidance application may retrieve metadata associated with Officer Uhura for episode ten of "Star Trek." The media guidance application may determine a set of custom keywords corresponding to the character based on the metadata. For example, the media guidance application may determine, using the metadata corresponding to Officer Uhura, custom keywords such as "hailing on all frequencies" and the like.

In some embodiments, after determining the set of custom keywords, the media guidance application may retrieve dialog proximate to a custom keyword from the set of custom keywords. For example, the media guidance application may retrieve dialog where Officer Uhura is using "hailing on all frequencies" while speaking to other characters, e.g. Captain Picard. The media guidance application may determine a first vector, for the custom keyword from the set of custom keywords, based on the dialog proximate to the custom keyword. For example, the media guidance application may determine, using the retrieved dialog, a vector for the keyword "hailing on all frequencies." For example, the media guidance application may use a function like word2vec, a function used to reconstruct linguistic context of words, to determine a vector for the keyword "hailing on all frequencies."

In some embodiments, after determining the first vector, the media guidance application may retrieve a set of vectors corresponding to the set of base keywords. For example, the media guidance application may retrieve a set of vectors corresponding to the keywords from the set of base keywords like "yes," "no," "searching all services," and the like. The media guidance application may generate a vector difference set based on a vector difference between the first vector and each vector of the set of vectors, wherein the vector difference between the first vector and a vector of the set of vectors represents a level of similarity between the first vector and the vector of the set of vectors. For example, the media guidance application may subtract the vector corresponding to "hailing on all frequencies" from each of the vectors corresponding to the keywords from the set of base keywords like "yes," "no," "searching all services," and the like. Further, the media guidance application may take the magnitude of the difference of the vectors; thus, if two vectors are close to each other the magnitude of the difference will be small, indicating that the two keywords that correspond to the two vectors are close in meaning. The media guidance application may select a second vector from the set of vectors that has a corresponding lowest value in the vector difference set and select an equivalent base keyword from the set of base keywords corresponding to the second vector, thereby selecting the equivalent base keyword for the custom keyword. For example, the media guidance application may select the vector corresponding to the base keyword "searching all services" because its vector and thus its meaning will be the closest to the vector of the custom keyword "hailing on all frequencies."

In some embodiments, after selecting the equivalent base keyword, the media guidance application may receive a request from the user. For example, the media guidance application may receive a request from the user asking the media guidance application to search for the animated movie "Monsters University" through all services. The media guidance application may determine a response to the user request, wherein the response includes the equivalent base keyword from the set of base keywords. For example, the media guidance application may determine that the response to the user should be "Ok, searching all services." The media guidance application may modify the response to the request from the user by replacing the equivalent base keyword with the custom keyword. For example, the media guidance application may modify the response to the user to be "Ok, hailing on all frequencies."

In some embodiments, in order to determine the character in the media asset, the media guidance application may split the media asset into a plurality of segments, wherein each segment from the plurality of segments contains a portion of the media asset. For example, the media guidance application may split episode ten of "Star Trek" into ten segments. The media guidance application may receive a threshold number of segments. For example, the media guidance application may receive a threshold number of six. The media guidance application may determine that a character appears in the threshold number of segments of the plurality of segments. For example, the media guidance application may determine that Officer Uhura appears in six segments of the ten segments of episode ten of "Star Trek" and thus the media guidance application may identify Officer Uhura as an important character.

In some embodiments, in order to determine the set of custom keywords corresponding to the character based on the metadata, the media guidance application may retrieve a custom keyword threshold. For example, the media guidance application may receive a custom keyword threshold of ten. The media guidance application may determine a first number of times a given custom keyword from the set of custom keywords appears in the metadata. For example, the media guidance application may determine that the custom keyword "hailing on all frequencies" appears in the metadata eleven times. The media guidance application may determine whether the first number is greater than the custom keyword threshold. The media guidance application may determine that the number of times that "hailing on all frequencies" appears in the metadata is greater than the custom keywords threshold, i.e., eleven is greater than ten. The media guidance application may, in response to determining that the first number is greater than the custom keyword threshold, include the given custom keyword in the set of custom keywords. For example, the media guidance application may include the custom keyword "hailing on all frequencies" in the set of custom keywords.

In some embodiments, in order to determine for the custom keyword from the set of custom keywords the first vector based on the dialog proximate to the custom keyword, the media guidance application may determine, from the dialog proximate to the custom keyword, a portion of the dialog corresponding to the character. For example, the media guidance application may determine from the dialog containing the custom keyword "hailing on all frequencies" the portions of the dialog corresponding to Officer Uhura. The media guidance application may retrieve a keyword range. For example, the media guidance application may retrieve a keyword range of ninety-nine words. The media guidance application may determine, based on the portion of the dialog, a set of keywords corresponding to the character, wherein each keyword from the set of keywords is within the keyword range from the custom keyword in the portion of the dialog. For example, the media guidance application may determine a set of two hundred keywords wherein each of the keywords is located within ninety-nine words away from the custom keyword "hailing on all frequencies." The media guidance application may determine the first vector for the custom keyword from the set of custom keywords based on the set of keywords corresponding to the character. For example, the media guidance application may use the determined set of keywords to compute the vector associated with "hailing on all frequencies"; the computed vector will thus be representative of the meaning of the custom keyword based on the context in which the custom keyword was used.

In some embodiments, in order to retrieve the set of vectors corresponding to the set of base keywords, the media guidance application may retrieve a set of conversations with the user. For example, the media guidance application may retrieve a set of conversations that it had with the user. The media guidance application may determine, for each base keyword from the set of base keywords, a subset of conversations from the set of conversations corresponding to the base keyword. For example, the media guidance application may determine a subset of conversations in which the base keyword "searching all services" was used. The media guidance application may determine a vector corresponding to the base keyword based on the subset of conversations. For example, the media guidance application may determine a vector corresponding to the base keyword "searching all services" based on the determined subset of conversations. The media guidance application may include the vector in the set of vectors. For example, the media guidance application may include the vector corresponding to "searching all services" in the set of vectors.

In some embodiments, in order to generate the vector difference set based on the vector difference between the first vector and each vector of the set of vectors, the media guidance application may generate an intermediary vector difference set by subtracting the first vector from the each vector of the set of vectors. For example, the media guidance application may generate a set of differences between the vector corresponding to the custom keyword "hailing on all frequencies" and the vectors corresponding to the base keywords from the set of base keywords like "yes," "no," "searching all services," and the like. The media guidance application may generate the vector difference set by determining a magnitude of each entry of the intermediary vector difference set. For example, the media guidance application may determine the magnitude of each of the differences.

In some embodiments, when receiving the request from the user, the media guidance application may determine that the request from the user comprises a second custom keyword from the set of custom keywords. For example, the media guidance application may determine that the user used in his request the custom keyword "mercy will be the last thing on his mind" also associated with Officer Uhura. The media guidance application may, in response to the determining, generate for display information corresponding to the media asset. For example, the media guidance application may generate for display information corresponding to episode ten of "Star Trek."

In some embodiments, after receiving the request from the user, the media guidance application may determine that the request from the user comprises a second custom keyword, wherein the second custom keyword corresponds to a second character in the media asset. For example, the media guidance application may determine that the user used the custom keyword "make it so" corresponding to Captain Picard. The media guidance application may determine a third vector corresponding to the second custom keyword. The media guidance application may determine a second equivalent base keyword based on the third vector and the set of vectors. For example, the media guidance application may determine that "make it so" means "yes." The media guidance application may modify the request from the user request by replacing the second custom keyword with the second equivalent base keyword. For example, the media guidance application may modify the request from the user to be "yes" before further processing the request.

In some embodiments, the media guidance application may retrieve a set of voice characteristics corresponding to the character. For example, the media guidance application may retrieve a set of voice characteristics corresponding to Officer Uhura such as pitch, tone, rhythm, or the like. The media guidance application may retrieve a set of base voice characteristics. For example, the media guidance application may retrieve a set of base voice characteristics such as pitch, tone, rhythm, or the like, corresponding to the voice that the media guidance application usually uses to communicate with the user. The media guidance application may modify the set of base voice characteristics to conform to the set of voice characteristics corresponding to the character. For example, the media guidance application may adjust its typical voice characteristics to conform to the voice characteristics of Officer Uhura. The media guidance application may generate for playback the modified request from the user using the modified set of base voice characteristics. For example, the media guidance application may speak back to the user using the voice of Officer Uhura, on top of using the custom keywords associated with Officer Uhura.

In some embodiments, the media guidance application may assume traits of the characters from the media guidance application, while the media asset is being broadcast. For example, if the user is watching "Pirates of the Caribbean," the media guidance application may mimic characters from the media asset, including their accent and terminology. For example, if the user watched a lot of "Star Trek," the media guidance application may start to recognize "Make It So" as an affirmative answer when asking a Yes/No question. In this manner, a media asset can introduce new language into the home and fans of those shows will start to use that language. Allowing the media guidance application to adapt and use this language helps to form a greater bond with the media asset and supports their fandom.

Conventional systems do not allow the user to engage in any type of role play with the media guidance application. The systems and methods described herein provide a solution that allows the user to use the catch-phrases and generally engage in role-playing with the media guidance application. This solution may be achieved by a media guidance application that creates sets of custom keywords for characters from the media assets that the user recently viewed. Further, the media guidance application understands what the custom keywords mean by analyzing the context in which each custom keyword is used, creating a vector based on that context and identifying already known base keywords that have similar meaning to the custom keyword.

It should be noted that the systems, methods, apparatuses, and/or aspects described above may be applied to, or used in accordance with, other systems, methods, apparatuses, and/or aspects described in this disclosure.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Systems and methods are provided herein for generating a set of custom keywords based on a media asset. For example, the media guidance application may determine custom keywords such as "make it so" and "hailing on all frequencies" corresponding to Captain Picard and Officer Uhura, respectively, from the user's recently watched episode of the "Star Trek" series. Further, the media guidance application may determine that "make it so" means "yes" and "hailing on all frequencies" means "searching all services." The media guidance application may use the above-identified custom keywords to reply to a user request. For example, the media guidance application may reply to a request to search for "Monsters University" animated movie on all services by replying with "Ok, hailing on all frequencies" instead of replying with "Ok, searching all services."

Figures 1, 2:
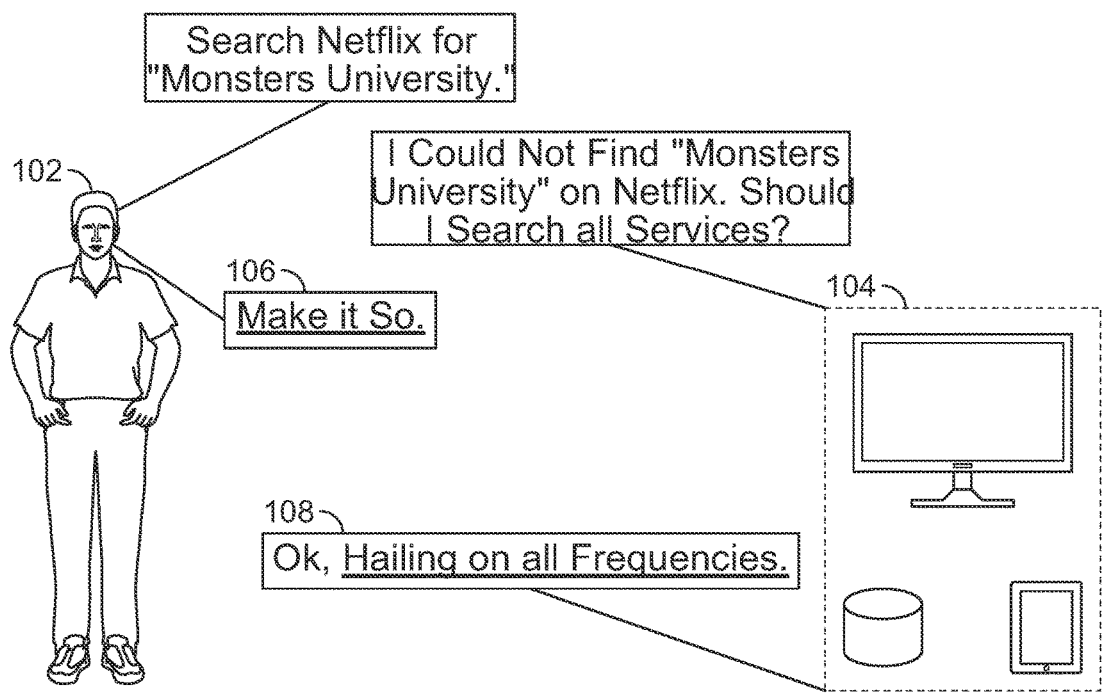
FIG. 1 shows an illustrative example of an interaction between a media guidance application and a user, the interaction containing custom keywords, in accordance with some embodiments of the disclosure.
FIG. 2 shows an illustrative example of a look-up table containing custom keywords and their respective equivalent base keywords, in accordance with some embodiments of the disclosure.

FIG. 1 shows an illustrative example of an interaction between a media guidance application and a user, the interaction containing custom keywords, in accordance with some embodiments of the disclosure. As depicted, FIG. 1 includes user 102, user equipment 104, second custom keyword 106, and custom keyword 108. User equipment 104 may include, for example, a TV, a computer, an intelligent personal assistant (IPA), a smart-phone, and the like.

FIG. 2 shows an illustrative example of a look-up table containing custom keywords and their respective equivalent base keywords, in accordance with some embodiments of the disclosure. As depicted, FIG. 2 includes set of base keywords 202 and set of custom keywords 204. As depicted, each custom keyword 108 from set of custom keywords 204 has a corresponding equivalent base keyword from set of base keywords 202.

As defined herein, the term "keyword" is defined to mean a word or a combination of words. As defined herein, the term "base keyword" is defined to refer to a keyword that the media guidance application is programmed to use. As defined herein, the term "custom keyword" is defined to refer to a keyword that a character in the media asset uses. As defined herein, the term "equivalent" is defined to mean equivalent in meaning.

In some aspects, the media guidance application may receive a media asset viewed by a user 102. For example, the media guidance application may receive episode ten of the "Star Trek" series, which was recently watched by the user 102. The media guidance application may receive a set of base keywords 202. For example, the media guidance application may receive keywords that are typically used in communication with the user 102. Examples of such keywords include "yes," "no," "searching all services," and the like. The media guidance application may determine a character in the media asset. For example, the media guidance application may determine that Officer Uhura is a character in episode ten of "Star Trek." The media guidance application may retrieve metadata corresponding to the character in the media asset. For example, the media guidance application may retrieve metadata associated with Officer Uhura for episode ten of "Star Trek." The media guidance application may determine a set of custom keywords 204 corresponding to the character based on the metadata. For example, the media guidance application may determine, using the metadata corresponding to Officer Uhura, custom keywords such as "hailing on all frequencies" and the like.

In some embodiments, after determining the set of custom keywords 204, the media guidance application may retrieve dialog proximate to a custom keyword 108 from the set of custom keywords 204. For example, the media guidance application may retrieve dialog where Officer Uhura is using "hailing on all frequencies" while speaking to other characters, e.g. Captain Picard. The media guidance application may determine a first vector, for the custom keyword 108 from the set of custom keywords 204, based on the dialog proximate to the custom keyword 108. For example, the media guidance application may determine, using the retrieved dialog, a vector for the keyword "hailing on all frequencies." For example, the media guidance application may use a function like word2vec, a function used to reconstruct linguistic context of words, to determine a vector for the keyword "hailing on all frequencies."

In some embodiments, after determining the first vector, the media guidance application may retrieve a set of vectors corresponding to the set of base keywords 202. For example, the media guidance application may retrieve a set of vectors corresponding to the keywords from the set of base keywords 202 like "yes," "no," "searching all services," and the like. The media guidance application may generate a vector difference set based on a vector difference between the first vector and each vector of the set of vectors, wherein the vector difference between the first vector and a vector of the set of vectors represents a level of similarity between the first vector and the vector of the set of vectors. For example, the media guidance application may subtract the vector corresponding to "hailing on all frequencies" from each of the vectors corresponding to the keywords from the set of base keywords 202 like "yes," "no," "searching all services," and the like. Further, the media guidance application may take the magnitude of the difference of the vectors; thus, if two vectors are close to each other the magnitude of the difference will be small, indicating that the two keywords that correspond to the two vectors are close in meaning. The media guidance application may select a second vector from the set of vectors that has a corresponding lowest value in the vector difference set and select an equivalent base keyword from the set of base keywords 202 corresponding to the second vector, thereby selecting the equivalent base keyword for the custom keyword 108. For example, the media guidance application may select the vector corresponding to the base keyword "searching all services" because its vector and thus its meaning will be the closest to the vector of the custom keyword 108 "hailing on all frequencies."

In some embodiments, after selecting the equivalent base keyword, the media guidance application may receive a request from the user 102. For example, the media guidance application may receive a request from the user 102 asking the media guidance application to search for the animated movie "Monsters University" through all services. The media guidance application may determine a response to the user 102 request, wherein the response includes the equivalent base keyword from the set of base keywords 202. For example, the media guidance application may determine that the response to the user 102 should be "Ok, searching all services." The media guidance application may modify the response to the request from the user 102 by replacing the equivalent base keyword with the custom keyword 108. For example, the media guidance application may modify the response to the user 102 to be "Ok, hailing on all frequencies."

In some embodiments, in order to determine the character in the media asset, the media guidance application may split the media asset into a plurality of segments, wherein each segment from the plurality of segments contains a portion of the media asset. For example, the media guidance application may split episode ten of "Star Trek" into ten segments. The media guidance application may receive a threshold number of segments. For example, the media guidance application may receive a threshold number of six. The media guidance application may determine that a character appears in the threshold number of segments of the plurality of segments. For example, the media guidance application may determine that Officer Uhura appears in six segments of the ten segments of episode ten of "Star Trek" and thus the media guidance application may identify Officer Uhura as an important character.

In some embodiments, in order to determine the set of custom keywords 204 corresponding to the character based on the metadata, the media guidance application may retrieve a custom keyword threshold. For example, the media guidance application may receive a custom keyword threshold of ten. The media guidance application may determine a first number of times a given custom keyword 108 from the set of custom keywords 204 appears in the metadata. For example, the media guidance application may determine that the custom keyword 108 "hailing on all frequencies" appears in the metadata eleven times. The media guidance application may determine whether the first number is greater than the custom keyword threshold. The media guidance application may determine that the number of times that "hailing on all frequencies" appears in the metadata is greater than the custom keywords threshold, i.e., eleven is greater than ten. The media guidance application may, in response to determining that the first number is greater than the custom keyword threshold, include the given custom keyword 108 in the set of custom keywords 204. For example, the media guidance application may include the custom keyword 108 "hailing on all frequencies" in the set of custom keywords 204.

In some embodiments, in order to determine for the custom keyword 108 from the set of custom keywords 204 the first vector based on the dialog proximate to the custom keyword, the media guidance application may determine, from the dialog proximate to the custom keyword, a portion of the dialog corresponding to the character. For example, the media guidance application may determine from the dialog containing the custom keyword 108 "hailing on all frequencies" the portions of the dialog corresponding to Officer Uhura. The media guidance application may retrieve a keyword range. For example, the media guidance application may retrieve a keyword range of ninety-nine words. The media guidance application may determine, based on the portion of the dialog, a set of keywords corresponding to the character, wherein each keyword from the set of keywords is within the keyword range from the custom keyword 108 in the portion of the dialog. For example, the media guidance application may determine a set of two hundred keywords wherein each of the keywords is located within ninety-nine words away from the custom keyword 108 "hailing on all frequencies." The media guidance application may determine the first vector for the custom keyword 108 from the set of custom keywords 204 based on the set of keywords corresponding to the character. For example, the media guidance application may use the determined set of keywords to compute the vector associated with "hailing on all frequencies"; the computed vector will thus be representative of the meaning of the custom keyword 108 based on the context in which the custom keyword 108 was used.

In some embodiments, in order to retrieve the set of vectors corresponding to the set of base keywords 202, the media guidance application may retrieve a set of conversations with the user 102. For example, the media guidance application may retrieve a set of conversations that it had with the user 102. The media guidance application may determine, for each base keyword from the set of base keywords 202, a subset of conversations from the set of conversations corresponding to the base keyword. For example, the media guidance application may determine a subset of conversations in which the base keyword "searching all services" was used. The media guidance application may determine a vector corresponding to the base keyword based on the subset of conversations. For example, the media guidance application may determine a vector corresponding to the base keyword "searching all services" based on the determined subset of conversations. The media guidance application may include the vector in the set of vectors. For example, the media guidance application may include the vector corresponding to "searching all services" in the set of vectors.

In some embodiments, in order to generate the vector difference set based on the vector difference between the first vector and each vector of the set of vectors, the media guidance application may generate an intermediary vector difference set by subtracting the first vector from the each vector of the set of vectors. For example, the media guidance application may generate a set of differences between the vector corresponding to the custom keyword 108 "hailing on all frequencies" and the vectors corresponding to the base keywords from the set of base keywords 202 like "yes," "no," "searching all services," and the like. The media guidance application may generate the vector difference set by determining a magnitude of each entry of the intermediary vector difference set. For example, the media guidance application may determine the magnitude of each of the differences.

In some embodiments, when receiving the request from the user 102, the media guidance application may determine that the request from the user 102 comprises a second custom keyword 106 from the set of custom keywords 204. For example, the media guidance application may determine that the user 102 used in his request the custom keyword 108 "mercy will be the last thing on his mind" also associated with Officer Uhura. The media guidance application may, in response to the determining, generate for display information corresponding to the media asset. For example, the media guidance application may generate for display information corresponding to episode ten of "Star Trek."

In some embodiments, after receiving the request from the user 102, the media guidance application may determine that the request from the user 102 comprises a second custom keyword, wherein the second custom keyword 106 corresponds to a second character in the media asset. For example, the media guidance application may determine that the user 102 used the custom keyword 108 "make it so" corresponding to Captain Picard. The media guidance application may determine a third vector corresponding to the second custom keyword. The media guidance application may determine a second equivalent base keyword based on the third vector and the set of vectors. For example, the media guidance application may determine that "make it so" means "yes." The media guidance application may modify the request from the user 102 request by replacing the second custom keyword 106 with the second equivalent base keyword. For example, the media guidance application may modify the request from the user 102 to be "yes" before further processing the request.

In some embodiments, the media guidance application may retrieve a set of voice characteristics corresponding to the character. For example, the media guidance application may retrieve a set of voice characteristics corresponding to Officer Uhura such as pitch, tone, rhythm, or the like. The media guidance application may retrieve a set of base voice characteristics. For example, the media guidance application may retrieve a set of base voice characteristics such as pitch, tone, rhythm, or the like, corresponding to the voice that the media guidance application usually uses to communicate with the user 102. The media guidance application may modify the set of base voice characteristics to conform to the set of voice characteristics corresponding to the character. For example, the media guidance application may adjust its typical voice characteristics to conform to the voice characteristics of Officer Uhura. The media guidance application may generate for playback the modified request from the user 102 using the modified set of base voice characteristics. For example, the media guidance application may speak back to the user 102 using the voice of Officer Uhura, on top of using the custom keywords associated with Officer Uhura.

The amount of content available to user 102s in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 3:
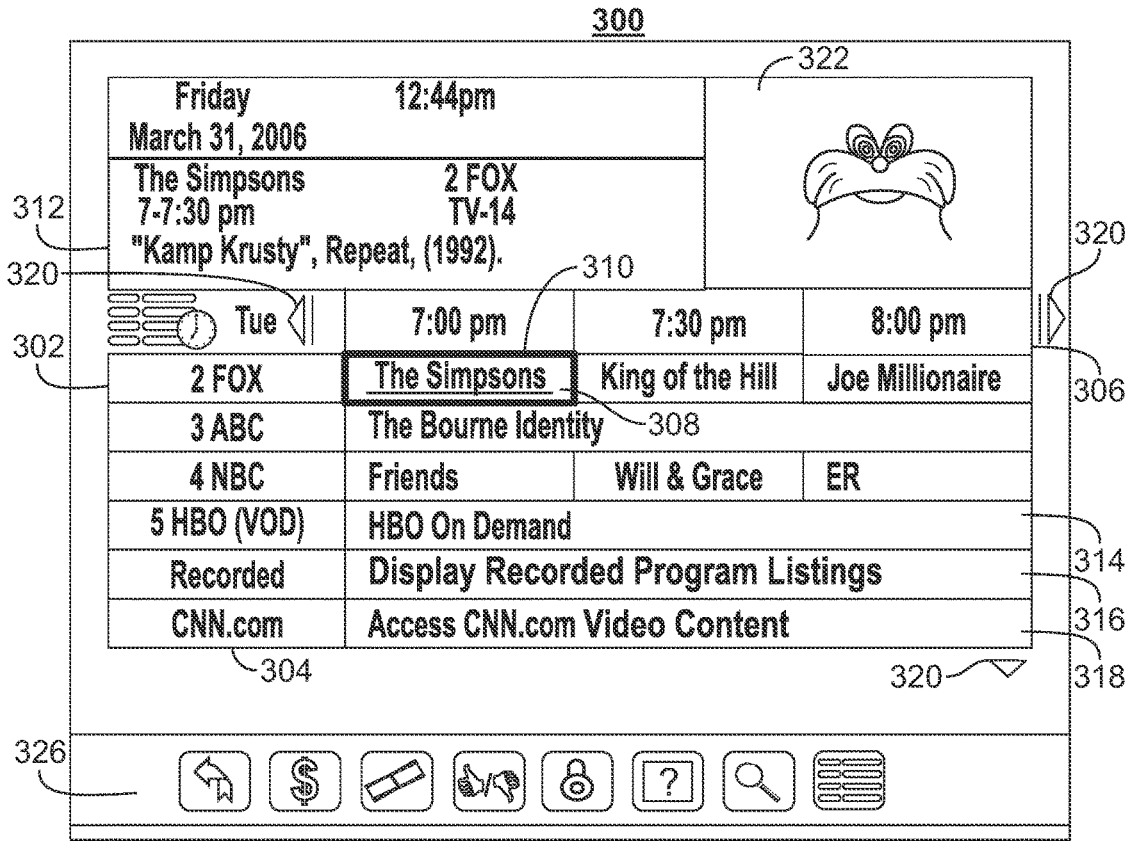
FIG. 3 shows an illustrative embodiment of a display screen that may be used to provide media guidance application listings and other media guidance information, in accordance with some embodiments of the disclosure.
Figure 4:
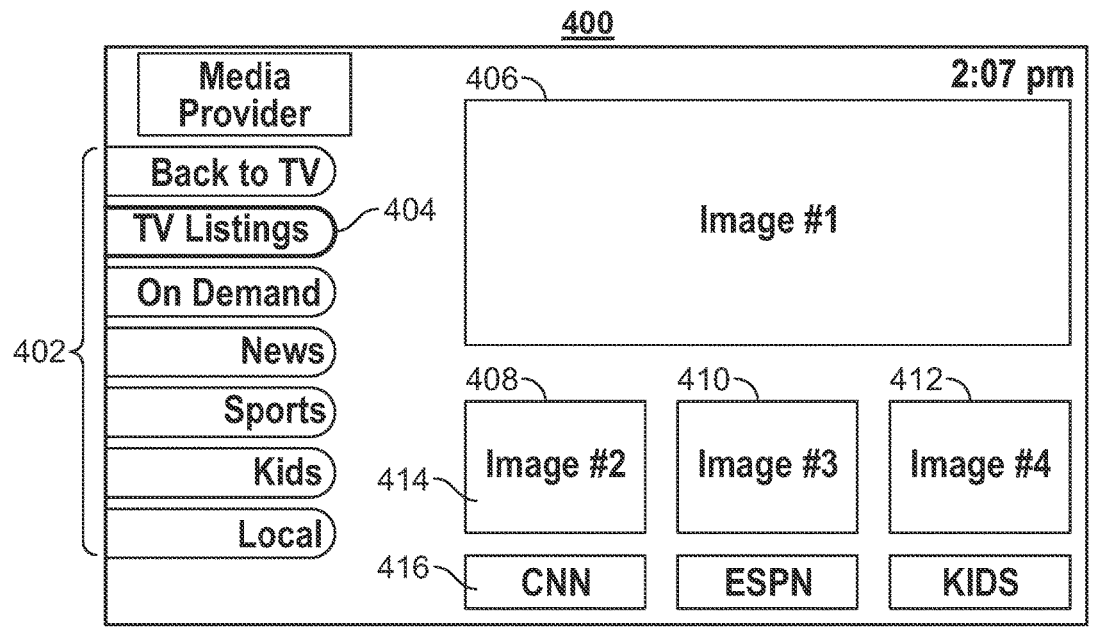
FIG. 4 shows another illustrative embodiment of a display screen that may be used to provide media guidance application listings, in accordance with some embodiments of the disclosure.

FIGS. 3-4 show illustrative display screens that may be used to provide media guidance data. The display screens shown in FIGS. 3-4 may be implemented on any suitable user equipment device or platform. While the displays of FIGS. 3-4 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 3 shows illustrative grid of a program listings display 300 arranged by time and channel that also enables access to different types of content in a single display. Display 300 may include grid 302 with: (1) a column of channel/content type identifiers 304, where each channel/content type identifier (which is a cell in the column) identifies a different channel or content type available; and (2) a row of time identifiers 306, where each time identifier (which is a cell in the row) identifies a time block of programming. Grid 302 also includes cells of program listings, such as program listing 308, where each listing provides the title of the program provided on the listing's associated channel and time. With a user input device, a user can select program listings by moving highlight region 310. Information relating to the program listing selected by highlight region 310 may be provided in program information region 312. Region 312 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 302 may provide media guidance data for non-linear programming including on-demand listing 314, recorded content listing 316, and Internet content listing 318. A display combining media guidance data for content from different types of content sources is sometimes referred to as a "mixed-media" display. Various permutations of the types of media guidance data that may be displayed that are different than display 300 may be based on user selection or guidance application definition (e.g., a display of only recorded and broadcast listings, only on-demand and broadcast listings, etc.). As illustrated, listings 314, 316, and 318 are shown as spanning the entire time block displayed in grid 302 to indicate that selection of these listings may provide access to a display dedicated to on-demand listings, recorded listings, or Internet listings, respectively. In some embodiments, listings for these content types may be included directly in grid 302. Additional media guidance data may be displayed in response to the user selecting one of the navigational icons 320. (Pressing an arrow key on a user input device may affect the display in a similar manner as selecting navigational icons 320.)

Display 300 may also include video region 322, and options region 326. Video region 322 may allow the user to view and/or preview programs that are currently available, will be available, or were available to the user. The content of video region 322 may correspond to, or be independent from, one of the listings displayed in grid 302. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 326 may allow the user to access different types of content, media guidance application displays, and/or media guidance application features. Options region 326 may be part of display 300 (and other display screens described herein), or may be invoked by a user by selecting an on-screen option or pressing a dedicated or assignable button on a user input device. The selectable options within options region 326 may concern features related to program listings in grid 302 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 6. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 4. Video mosaic display 400 includes selectable options 402 for content information organized based on content type, genre, and/or other organization criteria. In display 400, television listings option 404 is selected, thus providing listings 406, 408, 410, and 412 as broadcast program listings. In display 400 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 408 may include more than one portion, including media portion 414 and text portion 416. Media portion 414 and/or text portion 416 may be selectable to view content in full-screen or to view information related to the content displayed in media portion 414 (e.g., to view listings for the channel that the video is displayed on).

The listings in display 400 are of different sizes (i.e., listing 406 is larger than listings 408, 410, and 412), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 5:
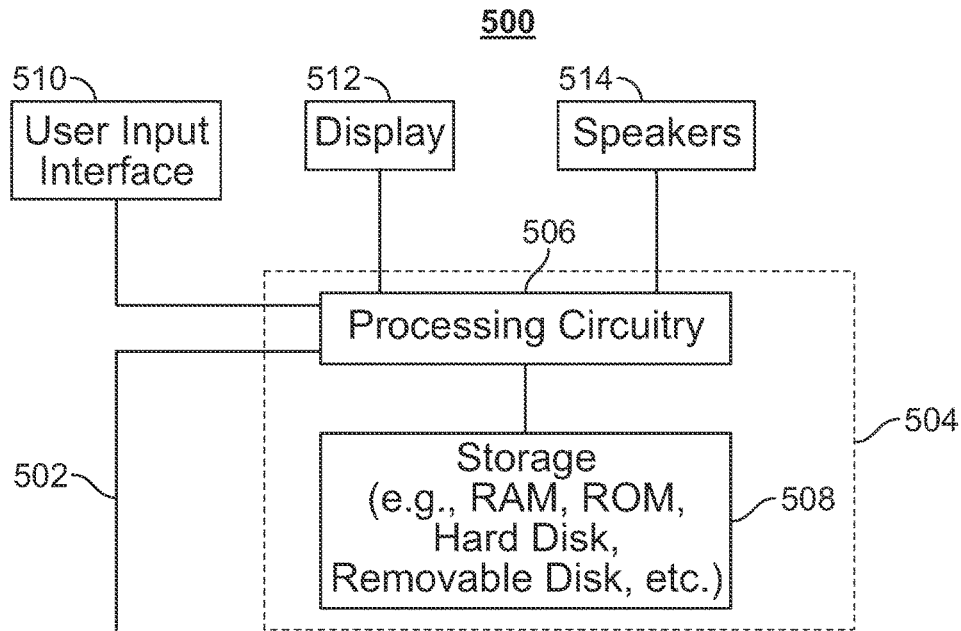
FIG. 5 is a block diagram of an illustrative user equipment (UE) device, in accordance with some embodiments of the disclosure.

Users may access content and the media guidance application (and its display screens described above and below) from one or more of their user equipment devices. FIG. 5 shows a generalized embodiment of illustrative user equipment device 500. More specific implementations of user equipment devices are discussed below in connection with FIG. 6. User equipment device 500 may receive content and data via input/output (hereinafter "I/O") path 502. I/O path 502 may provide content (e.g., broadcast programming, on-demand programming, Internet content, content available over a local area network (LAN) or wide area network (WAN), and/or other content) and data to control circuitry 504, which includes processing circuitry 506 and storage 508. Control circuitry 504 may be used to send and receive commands, requests, and other suitable data using I/O path 502. I/O path 502 may connect control circuitry 504 (and specifically processing circuitry 506) to one or more communications paths (described below). I/O functions may be provided by one or more of these communications paths, but are shown as a single path in FIG. 5 to avoid overcomplicating the drawing.

Control circuitry 504 may be based on any suitable processing circuitry such as processing circuitry 506. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 504 executes instructions for a media guidance application stored in memory (i.e., storage 508). Specifically, control circuitry 504 may be instructed by the media guidance application to perform the functions discussed above and below. For example, the media guidance application may provide instructions to control circuitry 504 to generate the media guidance displays. In some implementations, any action performed by control circuitry 504 may be based on instructions received from the media guidance application.

In client-server based embodiments, control circuitry 504 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 6). In addition, communications circuitry may include circuitry that enables peer-to-peer communication of user equipment devices, or communication of user equipment devices in locations remote from each other (described in more detail below).

Memory may be an electronic storage device provided as storage 508 that is part of control circuitry 504. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 508 may be used to store various types of content described herein as well as media guidance data described above. Nonvolatile memory may also be used (e.g., to launch a boot-up routine and other instructions). Cloud-based storage, described in relation to FIG. 6, may be used to supplement storage 508 or instead of storage 508.

Control circuitry 504 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 504 may also include scaler circuitry for upconverting and downconverting content into the preferred output format of the user equipment 500. Circuitry 504 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 508 is provided as a separate device from user equipment 500, the tuning and encoding circuitry (including multiple tuners) may be associated with storage 508.

A user may send instructions to control circuitry 504 using user input interface 510. User input interface 510 may be any suitable user interface, such as a remote control, mouse, trackball, keypad, keyboard, touch screen, touchpad, stylus input, joystick, voice recognition interface, or other user input interfaces. Display 512 may be provided as a stand-alone device or integrated with other elements of user equipment device 500. For example, display 512 may be a touchscreen or touch-sensitive display. In such circumstances, user input interface 510 may be integrated with or combined with display 512. Display 512 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 512 may be HDTV-capable. In some embodiments, display 512 may be a 3D display, and the interactive media guidance application and any suitable content may be displayed in 3D. A video card or graphics card may generate the output to the display 512. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 504. The video card may be integrated with the control circuitry 504. Speakers 514 may be provided as integrated with other elements of user equipment device 500 or may be stand-alone units. The audio component of videos and other content displayed on display 512 may be played through speakers 514. In some embodiments, the audio may be distributed to a receiver (not shown), which processes and outputs the audio via speakers 514.

The guidance application may be implemented using any suitable architecture. For example, it may be a stand-alone application wholly-implemented on user equipment device 500. In such an approach, instructions of the application are stored locally (e.g., in storage 508), and data for use by the application is downloaded on a periodic basis (e.g., from an out-of-band feed, from an Internet resource, or using another suitable approach). Control circuitry 504 may retrieve instructions of the application from storage 508 and process the instructions to generate any of the displays discussed herein. Based on the processed instructions, control circuitry 504 may determine what action to perform when input is received from input interface 510. For example, movement of a cursor on a display up/down may be indicated by the processed instructions when input interface 510 indicates that an up/down button was selected.

In some embodiments, the media guidance application is a client-server based application. Data for use by a thick or thin client implemented on user equipment device 500 is retrieved on-demand by issuing requests to a server remote to the user equipment device 500. In one example of a client-server based guidance application, control circuitry 504 runs a web browser that interprets web pages provided by a remote server. For example, the remote server may store the instructions for the application in a storage device. The remote server may process the stored instructions using circuitry (e.g., control circuitry 504) and generate the displays discussed above and below. The client device may receive the displays generated by the remote server and may display the content of the displays locally on equipment device 500. This way, the processing of the instructions is performed remotely by the server while the resulting displays are provided locally on equipment device 500. Equipment device 500 may receive inputs from the user via input interface 510 and transmit those inputs to the remote server for processing and generating the corresponding displays. For example, equipment device 500 may transmit a communication to the remote server indicating that an up/down button was selected via input interface 510. The remote server may process instructions in accordance with that input and generate a display of the application corresponding to the input (e.g., a display that moves a cursor up/down). The generated display is then transmitted to equipment device 500 for presentation to the user.

In some embodiments, the media guidance application is downloaded and interpreted or otherwise run by an interpreter or virtual machine (run by control circuitry 504). In some embodiments, the guidance application may be encoded in the ETV Binary Interchange Format (EBIF), received by control circuitry 504 as part of a suitable feed, and interpreted by a user agent running on control circuitry 504. For example, the guidance application may be an EBIF application. In some embodiments, the guidance application may be defined by a series of JAVA-based files that are received and run by a local virtual machine or other suitable middleware executed by control circuitry 504. In some of such embodiments (e.g., those employing MPEG-2 or other digital media encoding schemes), the guidance application may be, for example, encoded and transmitted in an MPEG-2 object carousel with the MPEG audio and video packets of a program.

Figure 6:
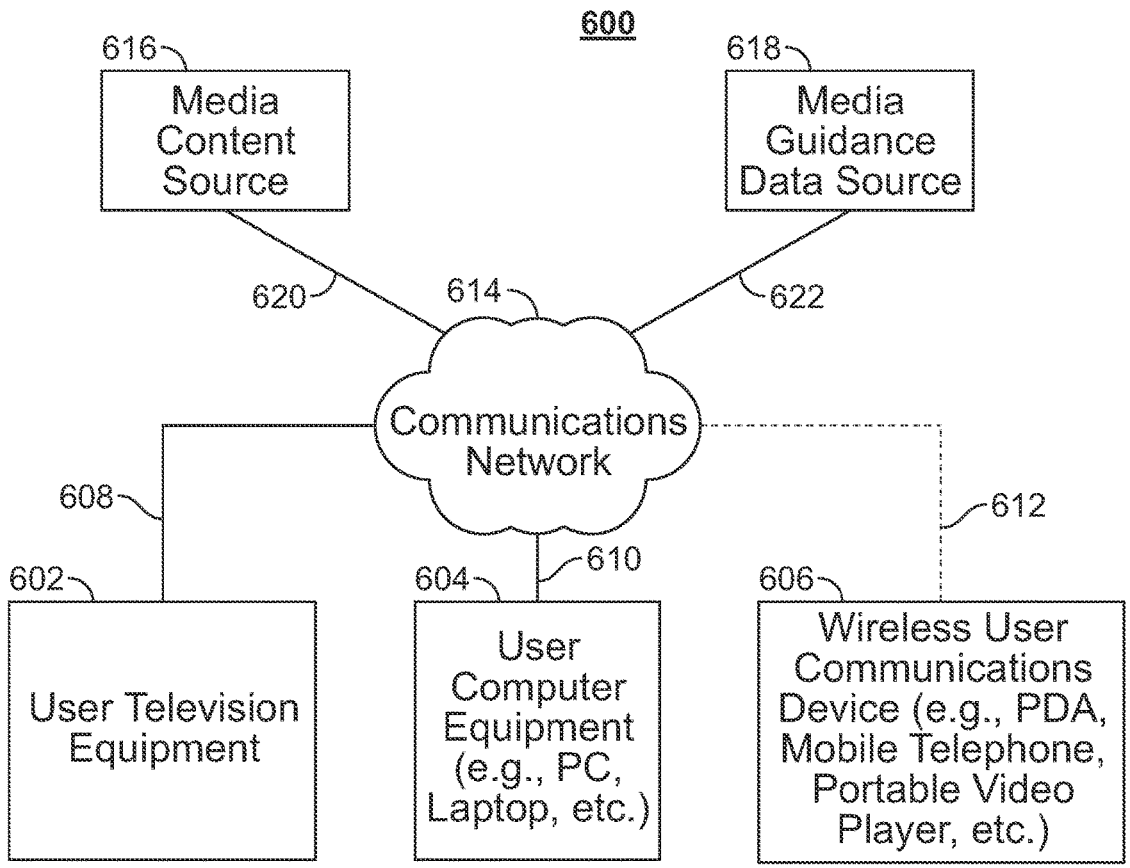
FIG. 6 is a block diagram of an illustrative media system, in accordance with some embodiments of the disclosure.

User equipment device 500 of FIG. 5 can be implemented in system 600 of FIG. 6 as user television equipment 602, user computer equipment 604, wireless user communications device 606, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 5 may not be classified solely as user television equipment 602, user computer equipment 604, or a wireless user communications device 606. For example, user television equipment 602 may, like some user computer equipment 604, be Internet-enabled allowing for access to Internet content, while user computer equipment 604 may, like some television equipment 602, include a tuner allowing for access to television programming. The media guidance application may have the same layout on various different types of user equipment or may be tailored to the display capabilities of the user equipment. For example, on user computer equipment 604, the guidance application may be provided as a web site accessed by a web browser. In another example, the guidance application may be scaled down for wireless user communications devices 606.

In system 600, there is typically more than one of each type of user equipment device but only one of each is shown in FIG. 6 to avoid overcomplicating the drawing. In addition, each user may utilize more than one type of user equipment device and also more than one of each type of user equipment device.

In some embodiments, a user equipment device (e.g., user television equipment 602, user computer equipment 604, wireless user communications device 606) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 614. Namely, user television equipment 602, user computer equipment 604, and wireless user communications device 606 are coupled to communications network 614 via communications paths 608, 610, and 612, respectively. Communications network 614 may be one or more networks including the Internet, a mobile phone network, mobile voice or data network (e.g., a 4G or LTE network), cable network, public switched telephone network, or other types of communications network or combinations of communications networks. Paths 608, 610, and 612 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 612 is drawn with dotted lines to indicate that in the exemplary embodiment shown in FIG. 6 it is a wireless path and paths 608 and 610 are drawn as solid lines to indicate they are wired paths (although these paths may be wireless paths, if desired). Communications with the user equipment devices may be provided by one or more of these communications paths, but are shown as a single path in FIG. 6 to avoid overcomplicating the drawing.

Although communications paths are not drawn between user equipment devices, these devices may communicate directly with each other via communication paths, such as those described above in connection with paths 608, 610, and 612, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 614.

System 600 includes content source 616 and media guidance data source 618 coupled to communications network 614 via communication paths 620 and 622, respectively. Paths 620 and 622 may include any of the communication paths described above in connection with paths 608, 610, and 612. Communications with the content source 616 and media guidance data source 618 may be exchanged over one or more communications paths, but are shown as a single path in FIG. 6 to avoid overcomplicating the drawing. In addition, there may be more than one of each of content source 616 and media guidance data source 618, but only one of each is shown in FIG. 6 to avoid overcomplicating the drawing. (The different types of each of these sources are discussed below.) If desired, content source 616 and media guidance data source 618 may be integrated as one source device. Although communications between sources 616 and 618 with user equipment devices 602, 604, and 606 are shown as through communications network 614, in some embodiments, sources 616 and 618 may communicate directly with user equipment devices 602, 604, and 606 via communication paths (not shown) such as those described above in connection with paths 608, 610, and 612.

Content source 616 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 616 may be the originator of content (e.g., a television broadcaster, a Webcast provider, etc.) or may not be the originator of content (e.g., an on-demand content provider, an Internet provider of content of broadcast programs for downloading, etc.). Content source 616 may include cable sources, satellite providers, on-demand providers, Internet providers, over-the-top content providers, or other providers of content. Content source 616 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 618 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 618 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 618 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 618 may provide user equipment devices 602, 604, and 606 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 508, and executed by control circuitry 504 of a user equipment device 500. In some embodiments, media guidance applications may be client-server applications where only a client application resides on the user equipment device, and server application resides on a remote server. For example, media guidance applications may be implemented partially as a client application on control circuitry 504 of user equipment device 500 and partially on a remote server as a server application (e.g., media guidance data source 618) running on control circuitry of the remote server. When executed by control circuitry of the remote server (such as media guidance data source 618), the media guidance application may instruct the control circuitry to generate the guidance application displays and transmit the generated displays to the user equipment devices. The server application may instruct the control circuitry of the media guidance data source 618 to transmit data for storage on the user equipment. The client application may instruct control circuitry of the receiving user equipment to generate the guidance application displays.

Content and/or media guidance data delivered to user equipment devices 602, 604, and 606 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 600 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 6.

In one approach, user equipment devices may communicate with each other within a home network. User equipment devices can communicate with each other directly via short-range point-to-point communication schemes described above, via indirect paths through a hub or other similar device provided on a home network, or via communications network 614. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 616 to access content. Specifically, within a home, users of user television equipment 602 and user computer equipment 604 may access the media guidance application to navigate among and locate desirable content. Users may also access the media guidance application outside of the home using wireless user communications devices 606 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 614. These cloud resources may include one or more content sources 616 and one or more media guidance data sources 618. In addition or in the alternative, the remote computing sites may include other user equipment devices, such as user television equipment 602, user computer equipment 604, and wireless user communications device 606. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 604 or wireless user communications device 606 having content capture feature. Alternatively, the user can first transfer the content to a user equipment device, such as user computer equipment 604. The user equipment device storing the content uploads the content to the cloud using a data transmission service on communications network 614. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 5.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 7:
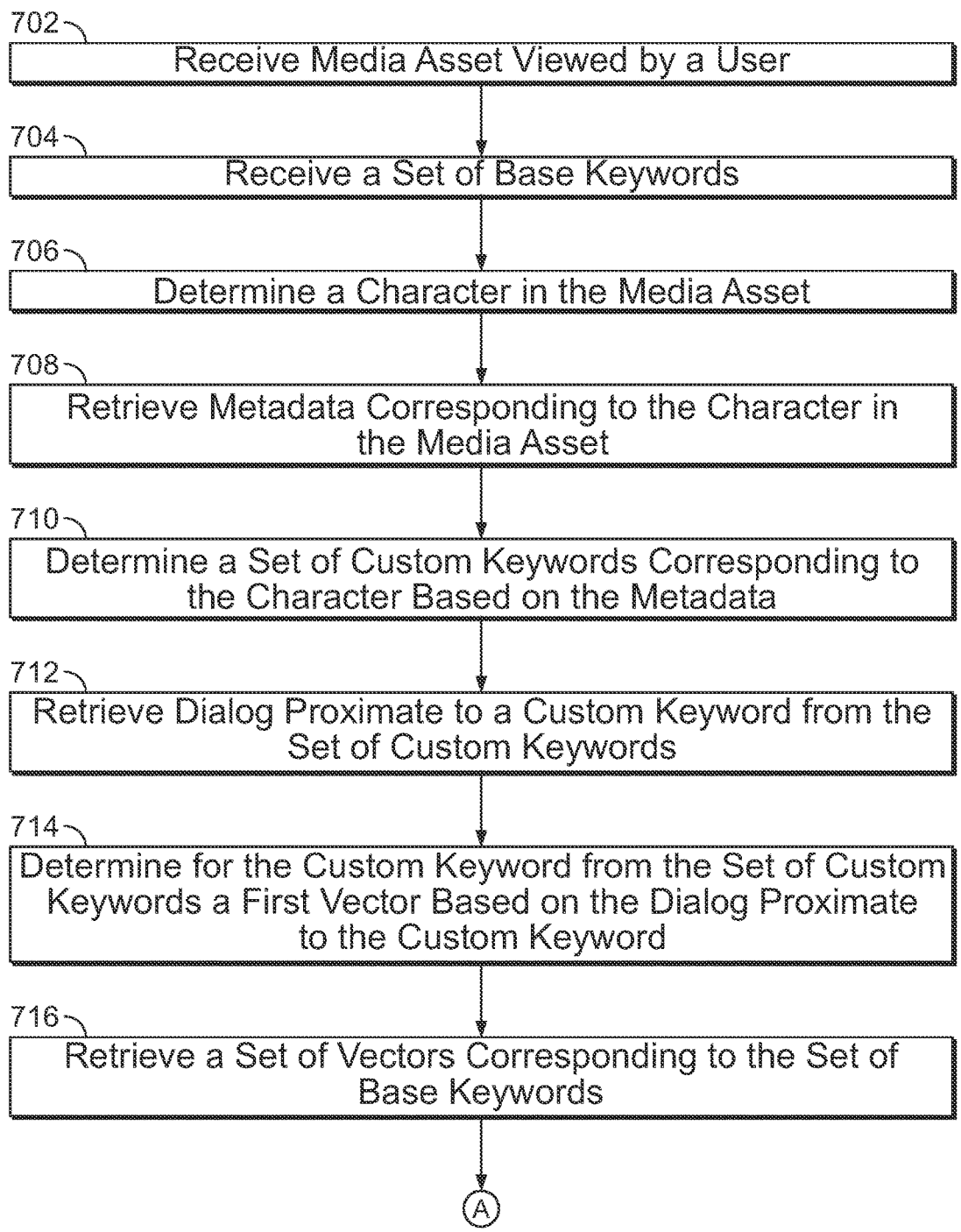
FIG. 7 depicts an illustrative flowchart of a process for generating a set of custom keywords based on a media asset by determining a set of equivalent base keywords, in accordance with some embodiments of the disclosure.
Figure 7:
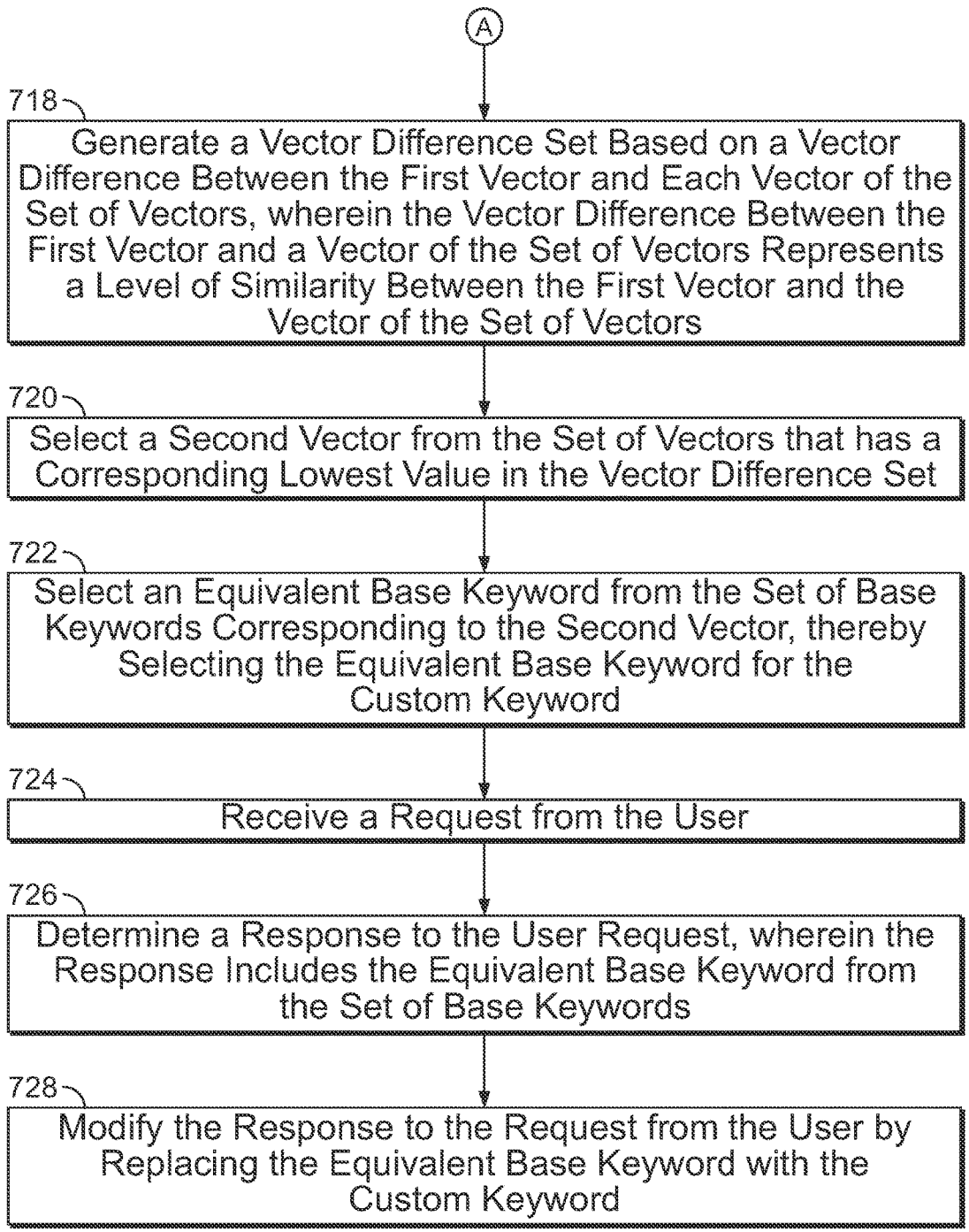

FIG. 7 depicts an illustrative flowchart of a process for generating a set of custom keywords 204 based on a media asset by determining a set of equivalent base keywords, in accordance with some embodiments of the disclosure. Process 700 may be executed by control circuitry 504 (e.g. in a manner instructed to control circuitry 504 by the media guidance application). Control circuitry 504 may be part of a remote server separated from the user 102 by communication network 614.

Process 700 begins at step 702, when control circuitry 504 receives a media asset viewed by a user 102. For example, control circuitry 504 may receive episode ten of the "Star Trek" series, which was recently watched by the user 102.

At step 704, control circuitry 504 receives a set of base keywords 202. Control circuitry 504 may retrieve the set of base keywords 202 from storage 508. For example, control circuitry 504 may receive keywords that are typically used in communication with the user 102. Examples of such keywords include "yes," "no," "searching all services," and the like.

At step 706, control circuitry 504 determines a character in the media asset. For example, control circuitry 504 may determine that Officer Uhura is a character in episode ten of "Star Trek."

At step 708, control circuitry 504 retrieves metadata corresponding to the character in the media asset. Control circuitry 504 may retrieve the metadata from storage 508. For example, control circuitry 504 may retrieve metadata associated with Officer Uhura for episode ten of "Star Trek."

At step 710, control circuitry 504 determines a set of custom keywords 204 corresponding to the character based on the metadata. For example, control circuitry 504 may determine, using the metadata corresponding to Officer Uhura, custom keywords such as "hailing on all frequencies" and the like.

At step 712, control circuitry 504 retrieves dialog proximate to a custom keyword 108 from the set of custom keywords 204. Control circuitry 504 may retrieve the dialog from storage 508. For example, control circuitry 504 may retrieve dialog where Officer Uhura is using "hailing on all frequencies" while speaking to other characters, e.g. Captain Picard.

At step 714, control circuitry 504 determines for the custom keyword 108 from the set of custom keywords 204 a first vector based on the dialog proximate to the custom keyword. For example, control circuitry 504 may determine, using the retrieved dialog, a vector for the keyword "hailing on all frequencies." For example, control circuitry 504 may use a function like word2vec, a function used to reconstruct linguistic context of words, to determine a vector for the keyword "hailing on all frequencies."

At step 716, control circuitry 504 retrieves a set of vectors corresponding to the set of base keywords 202. Control circuitry 504 may retrieve the set of vectors from storage 508. For example, control circuitry 504 may retrieve a set of vectors corresponding to the keywords from the set of base keywords 202 like "yes," "no," "searching all services," and the like.

At step 718, control circuitry 504 generates a vector difference set based on a vector difference between the first vector and each vector of the set of vectors, wherein the vector difference between the first vector and a vector of the set of vectors represents a level of similarity between the first vector and the vector of the set of vectors. For example, control circuitry 504 may subtract the vector corresponding to "hailing on all frequencies" from each of the vectors corresponding to the keywords from the set of base keywords 202 like "yes," "no," "searching all services," and the like. Further, control circuitry 504 may take the magnitude of the difference of the vectors; thus, if two vectors are close to each other the magnitude of the difference will be small, indicating that the two keywords that correspond to the two vectors are close in meaning.

At step 720, control circuitry 504 selects a second vector from the set of vectors that has a corresponding lowest value in the vector difference set.

At step 722, control circuitry 504 selects an equivalent base keyword from the set of base keywords 202 corresponding to the second vector, thereby selecting the equivalent base keyword for the custom keyword. For example, control circuitry 504 may select the vector corresponding to the base keyword "searching all services" because its vector and thus its meaning will be the closest to the vector of the custom keyword 108 "hailing on all frequencies."

At step 724, control circuitry 504 receives a request from the user 102. Control circuitry 504 may receive the request from the user 102 through user input interface 510. For example, control circuitry 504 may receive a request from the user 102 asking control circuitry 504 to search for the animated movie "Monsters University" through all services.

At step 726, control circuitry 504 determines a response to the user 102 request, wherein the response includes the equivalent base keyword from the set of base keywords 202. For example, control circuitry 504 may determine that the response to the user 102 should be "Ok, searching all services."

At step 728, control circuitry 504 modifies the response to the request from the user 102 by replacing the equivalent base keyword with the custom keyword. Control circuitry 504 may generate the response for playback through speakers 514 or display 512. For example, control circuitry 504 may modify the response to the user 102 to be "Ok, hailing on all frequencies."

Figure 8:
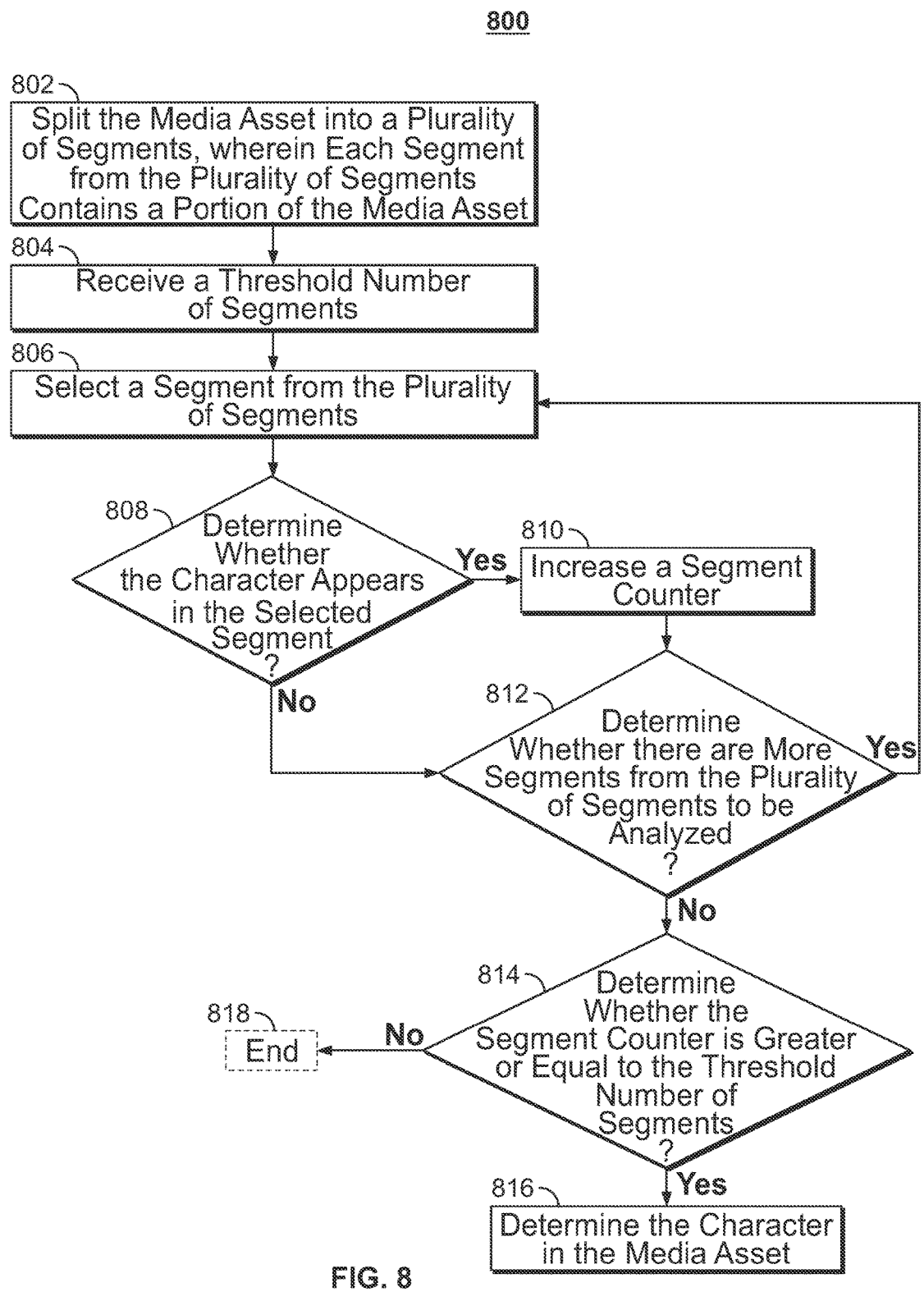
FIG. 8 depicts an illustrative flowchart of a process for determining the character in the media asset, in accordance with some embodiments of the disclosure.

FIG. 8 depicts an illustrative flowchart of a process for determining the character in the media asset, in accordance with some embodiments of the disclosure. Process 800 may be executed by control circuitry 504 (e.g. in a manner instructed to control circuitry 504 by the media guidance application). Control circuitry 504 may be part of remote server separated from the user 102 by communication network 614.

Process 800 begins at step 802, when control circuitry 504 splits the media asset into a plurality of segments, wherein each segment from the plurality of segments contains a portion of the media asset. For example, control circuitry 504 may split episode ten of "Star Trek" into ten segments.

At step 804, control circuitry 504 receives a threshold number of segments. Control circuitry 504 may retrieve the threshold number of segments from storage 508. For example, control circuitry 504 may receive a threshold number of six.

At step 806, control circuitry 504 selects a segment from the plurality of segments.

At step 808, control circuitry 504 determines whether the character appears in the selected segment.

If, at step 808, control circuitry 504 determines that the character appears in the selected segment, process 800 continues to step 810. At step 810, control circuitry 504 increases the segment counter.

If, at step 808, control circuitry 504 determines that the character does not appear in the selected segment, process 800 continues to step 812. At step 812, control circuitry 504 determines whether there are more segments from the plurality of segments to be analyzed.

If, at step 812, control circuitry 504 determines that there are more segments from the plurality of segments to be analyzed, process 800 continues to step 806.

If, at step 812, control circuitry 504 determines that there are no more segments from the plurality of segments to be analyzed, process 800 continues to step 814. At step 814, control circuitry 504 determines whether the segment counter is greater than or equal to the threshold number of segments.

If, at step 814, control circuitry 504 determines that the segment counter is greater than or equal to the threshold number of segments, process 800 continues to step 816. At step 816, control circuitry 504 determines the character in the media asset. For example, control circuitry 504 may determine that Officer Uhura appears in six segments of the ten segments of episode ten of "Star Trek" and thus control circuitry 504 may identify Officer Uhura as an important character.

If, at step 814, control circuitry 504 determines that the segment counter is not greater than or equal to the threshold number of segments, process 800 optionally continues to step 818. At step 818, process 818 may end.

Figure 9:
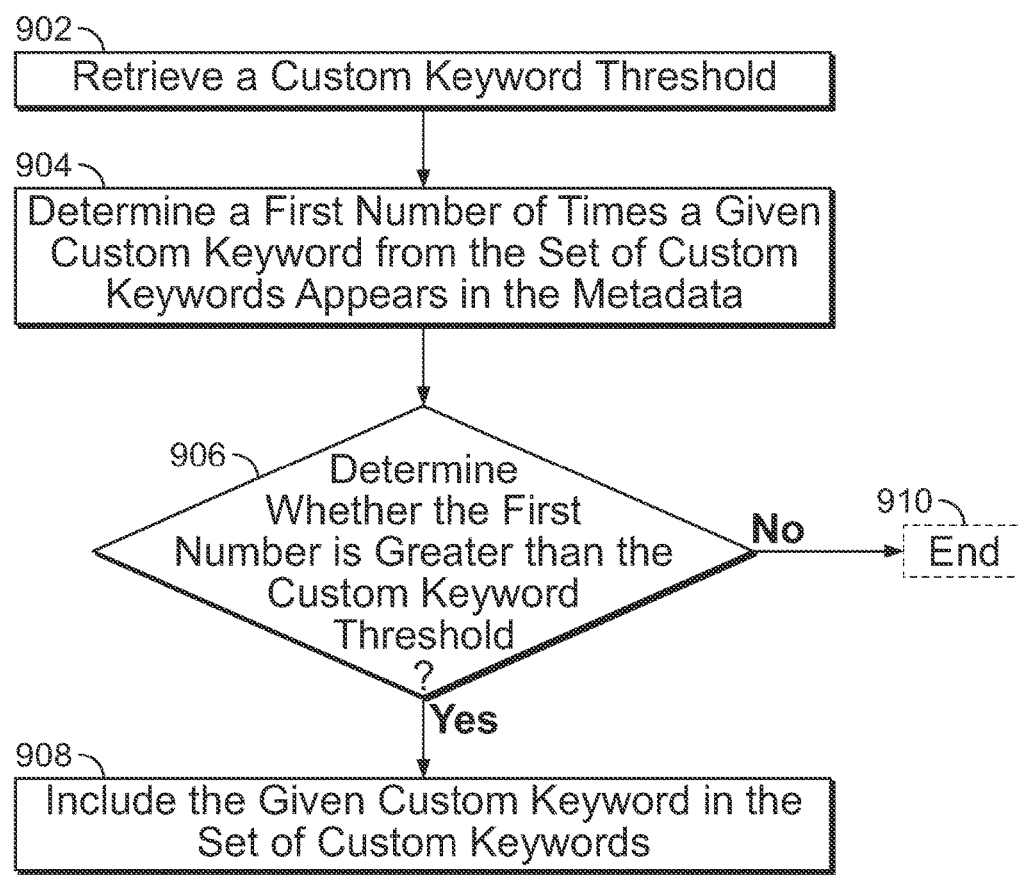
FIG. 9 depicts an illustrative flowchart of a process for determining the set of custom keywords corresponding to the character based on the metadata, in accordance with some embodiments of the disclosure.

FIG. 9 depicts an illustrative flowchart of a process for determining the set of custom keywords 204 corresponding to the character based on the metadata, in accordance with some embodiments of the disclosure. Process 900 may be executed by control circuitry 504 (e.g. in a manner instructed to control circuitry 504 by the media guidance application). Control circuitry 504 may be part of remote server separated from the user 102 by communication network 614.

Process 900 begins at step 902, when control circuitry 508 retrieves a custom keyword threshold. Control circuitry may receive the custom keyword threshold from storage 508. For example, control circuitry 504 may receive a custom keyword threshold of ten.

At step 904, control circuitry 508 determines a first number of times a given custom keyword 108 from the set of custom keywords 204 appears in the metadata. For example, control circuitry 504 may determine that the custom keyword 108 "hailing on all frequencies" appears in the metadata eleven times.

At step 906, control circuitry 508 determines whether the first number is greater that the custom keyword threshold. Control circuitry 504 may determine that the number of times that "hailing on all frequencies" appears in the metadata is greater than the custom keywords threshold; i.e. eleven is greater than ten.

If, at step 906, control circuitry 508 determines that the first number is greater than the custom keyword threshold, process 900 continues to step 908. At step 908, control circuitry 508 includes the given custom keyword 108 in the set of custom keywords 204. For example, control circuitry 504 may include the custom keyword 108 "hailing on all frequencies" in the set of custom keywords 204.

If, at step 906, control circuitry 508 determines that the first number is not greater than the custom keyword threshold, process 900 optionally continues to step 910. At step 910, process 900 may end.

Figure 10:
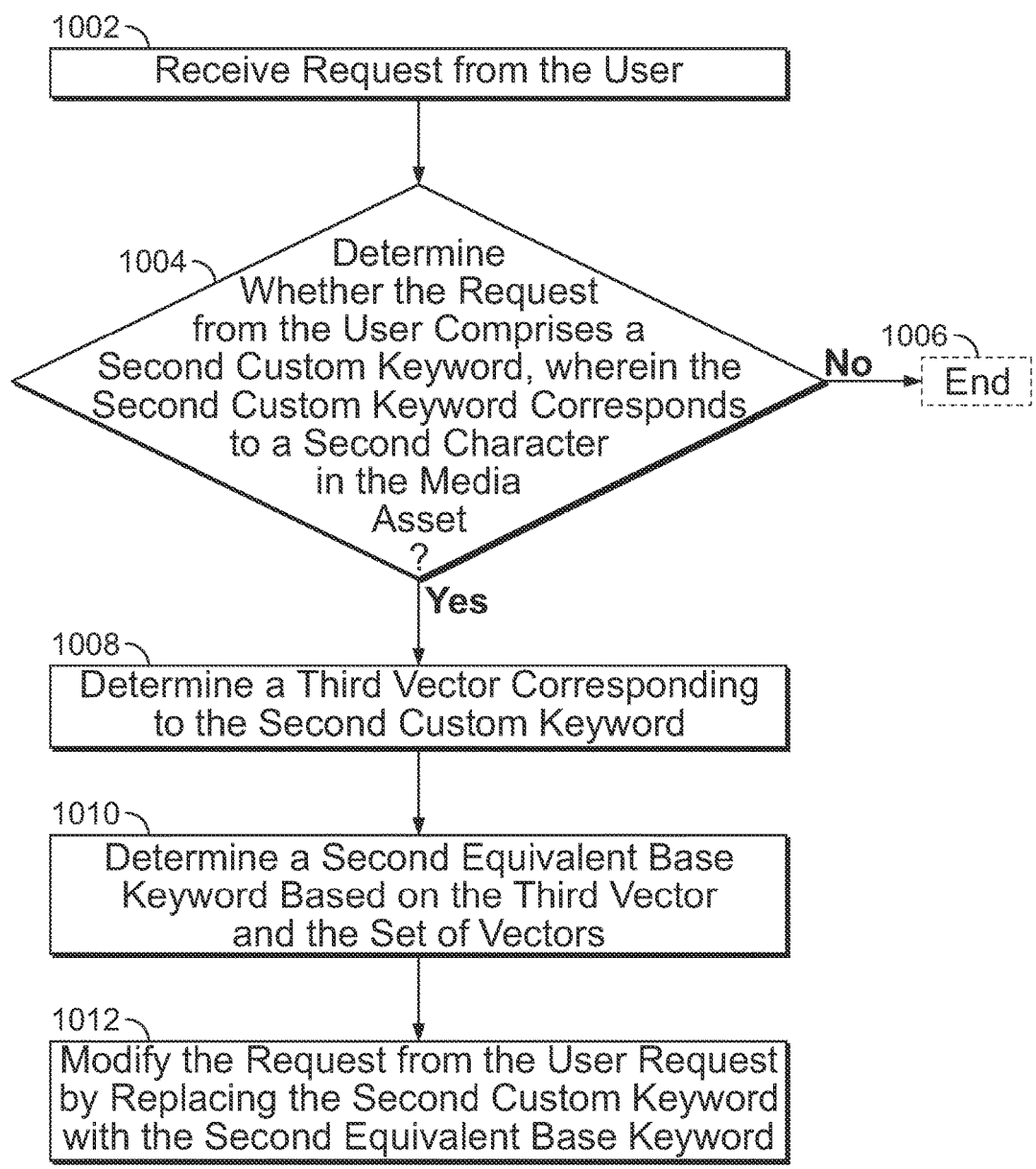
FIG. 10 depicts an illustrative flowchart of a process for receiving and modifying the request from the user, in accordance with some embodiments of the disclosure.

FIG. 10 depicts an illustrative flowchart of a process for receiving and modifying the request from the user 102, in accordance with some embodiments of the disclosure. Process 1000 may be executed by control circuitry 504 (e.g. in a manner instructed to control circuitry 504 by the media guidance application). Control circuitry 504 may be part of remote server separated from the user 102 by communication network 614.

Process 1000 begins at step 1002, when control circuitry 504 receives request from the user 102. Control circuitry 504 may receive the request from user 102 input interface 510. For example, control circuitry 504 may receive a request from the user 102 asking control circuitry 504 to search for the animated movie "Monsters University" through all services.

At step 1004, control circuitry 504 determines whether the request from the user 102 comprises a second custom keyword, wherein the second custom keyword 106 corresponds to a second character in the media asset. For example, control circuitry 504 may determine that the user 102 used the custom keyword 108 "make it so" corresponding to Captain Picard.

If, at step 1004, control circuitry 504 determines that the request from the user 102 does not comprise a second custom keyword, wherein the second custom keyword 106 corresponds to a second character in the media asset, process 1000 may optionally continue to step 1006. At step 1006, process 1000 may end.

If, at step 1004, control circuitry 504 determines that the request from the user 102 comprises a second custom keyword, wherein the second custom keyword 106 corresponds to a second character in the media asset, process 1000 may optionally continue to step 1008. At step 1008, control circuitry 504 determines a third vector corresponding to the second custom keyword.

At step 1010, control circuitry 504 determines a second equivalent base keyword based on the third vector and the set of vectors. For example, control circuitry 504 may determine that "make it so" means "yes."

At step 1012, control circuitry 504 may modify the request from the user 102 request by replacing the second custom keyword 106 with the second equivalent base keyword. For example, control circuitry 504 may modify the request from the user 102 to be "yes" before further processing the request.

Figure 11:
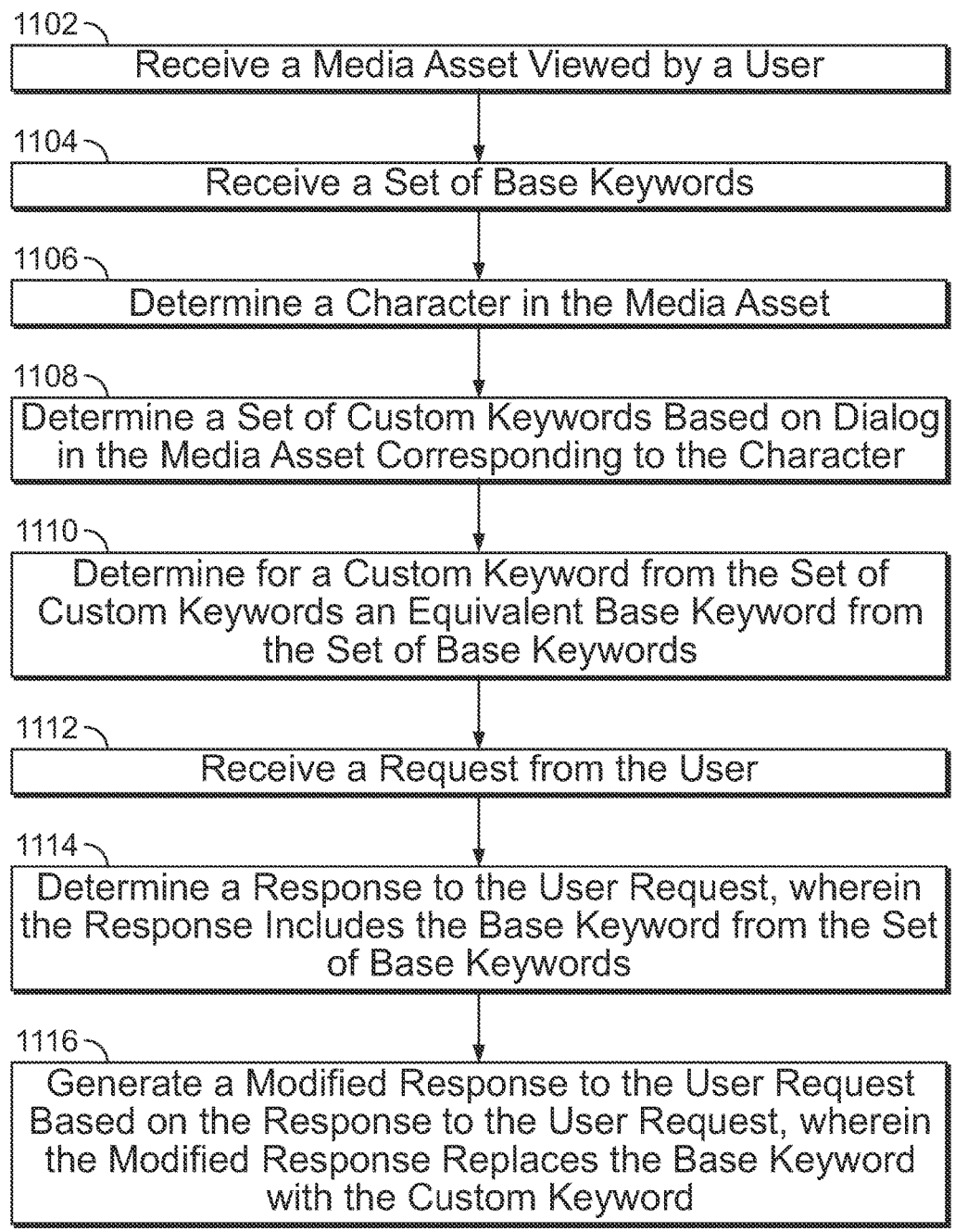
FIG. 11 depicts yet another illustrative flowchart of a process for generating a set of custom keywords based on a media asset, in accordance with some embodiments of the disclosure.

FIG. 11 depicts yet another illustrative flowchart of a process for generating a set of custom keywords 204 based on a media asset, in accordance with some embodiments of the disclosure. Process 1100 may be executed by control circuitry 504 (e.g. in a manner instructed to control circuitry 504 by the media guidance application). Control circuitry 504 may be part of remote server separated from the user 102 by communication network 614.

Process 1100 begins at step 1102, when control circuitry 504 receives a media asset viewed by a user 102.

At step 1104, control circuitry 504 receives a set of base keywords 202.

At step 1106, control circuitry 504 determines a character in the media asset.

At step 1108, control circuitry 504 determines a set of custom keywords 204 based on dialog in the media asset corresponding to the character.

At step 1110, control circuitry 504 determines for a custom keyword 108 from the set of custom keywords 204 an equivalent base keyword from the set of base keywords 202.

At step 1112, control circuitry 504 receives a request from the user 102.

At step 1114, control circuitry 504 determines a response to the user 102 request, wherein the response includes the base keyword from the set of base keywords 202.

At step 1116, control circuitry 504 generates a modified response to the user 102 request based on the response to the user 102 request, wherein the modified response replaces the base keyword with the custom keyword.

It is contemplated that the steps or descriptions of each of FIGS. 7-11 may be used with any other embodiment of this disclosure. In addition, the steps and descriptions described in relation to FIGS. 7-11 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-6 could be used to perform one or more of the steps in FIGS. 7-11.

It will be apparent to those of ordinary skill in the art that methods involved in the present invention may be embodied in a computer program product that includes a computer-usable and/or readable medium. For example, such a computer-usable medium may consist of a read-only memory device, such as a CD-ROM disk or conventional ROM device, or a random access memory, such as a hard drive device or a computer diskette, having a computer-readable program code stored thereon. It should also be understood that methods, techniques, and processes involved in the present disclosure may be executed using processing circuitry. The processing circuitry, for instance, may be a general purpose processor, a customized integrated circuit (e.g., an ASIC), or a field-programmable gate array (FPGA) within user 102 equipment 500, media content source 616, or media guidance data source 618.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for generating a set of custom keywords based on a plurality of media assets viewed by a user, comprising:
   receiving a set of base keywords;
   receiving metadata corresponding to the plurality of media assets viewed by a user;
   identifying, based on the metadata and the determination, a plurality of custom keywords corresponding to the media assets viewed by the user;
   determining a first vector for each of the custom keywords;
   retrieving a set of vectors corresponding to the set of base keywords;
   for each of the plurality of custom keywords:
      generating a vector difference set based on a vector difference between the first vector for the custom keyword and each vector of the set of vectors, wherein each vector difference represents a level of similarity between the first vector and each vector of the set of vectors; and
      mapping a base keyword of the set of base keywords as corresponding to the custom keyword based on the vector difference set;
   receiving a request from the user;
   determining that the request corresponds to a first custom keyword of the plurality of custom keywords;
   identifying a first base keyword of the set of base keywords that corresponds to the first custom keyword based on the mapping;
   determining a response to the request based on the first base keyword, wherein the response comprises a second base keyword of the set of base keywords; and
   modifying the response to the request by replacing the second base keyword with a second custom keyword of the plurality of custom keywords based on the mapping.

2. The method of claim 1, further comprising:
   determining a character related to the custom keywords by:
      determining a media asset associated with the custom keywords using metadata associated with the media assets viewed by the user;
      splitting the media asset into a plurality of segments, wherein each segment from the plurality of segments contains a character;
      receiving a threshold number of segments; and
      determining that the character appears in the threshold number of segments of the plurality of segments.

3. The method of claim 1, wherein determining the set of custom keywords based on the metadata, comprises:
   retrieving a custom keyword threshold;
   determining a first number of times a given custom keyword from the set of custom keywords appears in the metadata;
   determining whether the first number is greater than the custom keyword threshold; and
   in response to determining that the first number is greater than the custom keyword threshold, including the given custom keyword in the set of custom keywords.

4. The method of claim 1, wherein determining a first vector for each of the custom keywords, comprises:
   determining a dialog proximate to the custom keyword in the media assets viewed by the user;
   retrieving a keyword range;
   determining, based on the media assets viewed by the user, a set of keywords, wherein each keyword from the set of keywords is within the keyword range from the custom keyword; and
   determining the first vector for the custom keyword from the set of custom keywords based on the set of keywords.

5. The method of claim 1, wherein retrieving the set of vectors corresponding to the set of base keywords, comprises:
   retrieving a set of conversations with the user;
   determining, for each base keyword from the set of base keywords, a subset of conversations from the set of conversations corresponding to the base keyword;
   determining a vector corresponding to the base keyword based on the subset of conversations; and
   including the vector in the set of vectors.

6. The method of claim 1, wherein generating the vector difference set based on the vector difference between the first vector and each vector of the set of vectors, comprises:
   generating an intermediary vector difference set by subtracting the first vector from each vector of the set of vectors; and
   generating the vector difference set by determining a magnitude of each entry of the intermediary vector difference set.

7. The method of claim 1, wherein the custom keyword is a first custom keyword and wherein receiving the request from the user, comprises:
   determining that the request from the user comprises a second custom keyword from the set of custom keywords; and
   in response to the determining, generating for display information corresponding to a media asset related to the second custom keyword.

8. The method of claim 1, wherein the custom keyword is a first custom keyword corresponding to a first media asset viewed by the user, and wherein receiving the request from the user, comprises:
   determining that the request from the user comprises a second custom keyword, a second media asset viewed by the user.

9. The method of claim 8, further comprising:
   determining a third vector corresponding to the second custom keyword;

determining a second equivalent base keyword based on the third vector and the set of vectors; and modifying the request from the user request by replacing the second custom keyword with the second equivalent base keyword.

10. The method of claim 1, further comprising:
retrieving a set of voice characteristics corresponding to the character;
retrieving a set of base voice characteristics;
modifying the set of base voice characteristics to conform to the set of voice characteristics corresponding to a character in a media asset viewed by the user; and
generating for playback the modified request from the user using the modified set of base voice characteristics.

11. A system for generating a set of custom keywords based on a plurality of media assets viewed by a user, the system comprising:
storage circuitry configured to store a set of base keywords;
communications circuitry configured to:
receive metadata corresponding to the plurality of media assets viewed by a user;
retrieve a set of vectors corresponding to the set of base keywords; and
control circuitry configured to:
retrieve, from the storage circuitry, the set of base keywords;
identify, based on the metadata and the determination, a plurality of custom keywords corresponding to the media assets viewed by the user;
determine a first vector for each of the custom keywords;
for each of the plurality of custom keywords:
generate a vector difference set based on a vector difference between the first vector for the custom keyword and each vector of the set of vectors, wherein each vector difference represents a level of similarity between the first vector and each vector of the set of vectors; and
map a base keyword of the set of base keywords as corresponding to the custom keyword based on the vector difference set;
receive a request from the user;
determine that the request corresponds to a first custom keyword of the plurality of custom keywords;
identify a first base keyword of the set of base keywords that corresponds to the first custom keyword based on the mapping;
determine a response to the request based on the first base keyword, wherein the response comprises a second base keyword of the set of base keywords; and
modify the response to the request by replacing the second base keyword with a second custom keyword of the plurality of custom keywords based on the mapping.

12. The system of claim 11, wherein the storage circuitry is further configured to store a threshold number of segments, and wherein the control circuitry is further configured to:
determine a character related to the custom keywords by:
determining a media asset associated with the custom keywords using metadata associated with the media assets viewed by the user;
splitting the media asset into a plurality of segments, wherein each segment from the plurality of segments contains a character;
receiving, from the storage circuitry, a threshold number of segments; and
determining that the character appears in the threshold number of segments of the plurality of segments.

13. The system of claim 11, wherein the storage circuitry is further configured to store a custom keyword threshold, and wherein the control circuitry is further configured, when determining the set of custom keywords based on the metadata, to:
retrieve the custom keyword threshold from the storage circuitry;
determine a first number of times a given custom keyword from the set of custom keywords appears in the metadata;
determine whether the first number is greater than the custom keyword threshold; and
in response to determining that the first number is greater than the custom keyword threshold, include the given custom keyword in the set of custom keywords.

14. The system of claim 11, wherein the storage circuitry is further configured to store a keyword range, and wherein the control circuitry is further configured, when determining a first vector for each of the custom keywords, to:
determine a dialog proximate to the custom keyword in the media assets viewed by the user;
retrieve the keyword range from the storage circuitry;
determine, based on the media assets viewed by the user, a set of keywords, wherein each keyword from the set of keywords is within the keyword range from the custom keyword; and
determine the first vector for the custom keyword from the set of custom keywords based on the set of keywords.

15. The system of claim 11, wherein the communications circuitry is further configured, when retrieving the set of vectors corresponding to the set of base keywords, to retrieve a set of conversations with the user and wherein the control circuitry is further configured to:
determine, for each base keyword from the set of base keywords, a subset of conversations from the set of conversations corresponding to the base keyword;
determine a vector corresponding to the base keyword based on the subset of conversations; and
include the vector in the set of vectors.

16. The system of claim 11, wherein generating the vector difference set based on the vector difference between the first vector and each vector of the set of vectors, comprises:
generating an intermediary vector difference set by subtracting the first vector from each vector of the set of vectors; and
generating the vector difference set by determining a magnitude of each entry of the intermediary vector difference set.

17. The system of claim 11, wherein the custom keyword is a first custom keyword and wherein the control circuitry is further configured, when receiving the request from the user, to:
determine that the request from the user comprises a second custom keyword from the set of custom keywords; and
in response to the determining, generate for display information corresponding to a media asset related to the second custom keyword.

18. The system of claim 11, wherein the custom keyword is a first custom keyword corresponding to a first media asset viewed by the user, and wherein the control circuitry is further configured, when receiving the request from the user, to:
  determining that the request from the user comprises a second custom keyword, a second media asset viewed by the user.

19. The system of claim 18, wherein the control circuitry is further configured to:
  determine a third vector corresponding to the second custom keyword;
  determine a second equivalent base keyword based on the third vector and the set of vectors; and
  modify the request from the user request by replacing the second custom keyword with the second equivalent base keyword.

20. The system of claim 11, wherein:
  the communications circuitry is further configured to:
    retrieve a set of voice characteristics corresponding to the character;
    retrieve a set of base voice characteristics; and
  the control circuitry is further configured to:
    modify the set of base voice characteristics to conform to the set of voice characteristics corresponding to a character in a media asset viewed by the user; and
    generate for playback the modified request from the user using the modified set of base voice characteristics.

* * * * *